United States Patent
Hood

(10) Patent No.: US 10,505,321 B2
(45) Date of Patent: Dec. 10, 2019

(54) CONNECTOR DEVICE INCLUDING PLANAR MEMBER WITH SLITS TO RECEIVE ELECTRICAL TABS OF FUEL CELL STACK

(71) Applicant: Intelligent Energy Limited, Loughborough (GB)

(72) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/629,606

(22) Filed: Jun. 21, 2017

(65) Prior Publication Data

US 2017/0288351 A1    Oct. 5, 2017

Related U.S. Application Data

(63) Continuation of application No. 13/989,379, filed as application No. PCT/GB2011/052265 on Nov. 18, 2011, now Pat. No. 9,692,190.

(30) Foreign Application Priority Data

Dec. 3, 2010 (GB) .................................. 1020478.2

(51) Int. Cl.
*H01R 24/20* (2011.01)
*H01M 8/2418* (2016.01)
(Continued)

(52) U.S. Cl.
CPC .......... *H01R 24/20* (2013.01); *H01M 8/0247* (2013.01); *H01M 8/0269* (2013.01);
(Continued)

(58) Field of Classification Search
CPC ............. H01M 8/2418; H01M 8/0247; H01M 8/0269; H01M 8/04552; H01M 8/247; H01R 24/20
(Continued)

(56) References Cited

U.S. PATENT DOCUMENTS

| 3,496,520 A | 2/1970 | Reynolds |
|---|---|---|
| 7,361,065 B1 | 4/2008 | Hardy |

(Continued)

FOREIGN PATENT DOCUMENTS

| CN | 202308181 U | 7/2012 |
|---|---|---|
| GB | 1184002 A | 3/1970 |

(Continued)

OTHER PUBLICATIONS

Ariyoshi, Toshiaki, Machine Translation of JP 2004-127777 A, Apr. 2004 (Year: 2004).*

(Continued)

*Primary Examiner* — Sean P. Cullen
(74) *Attorney, Agent, or Firm* — BakerHostetler

(57) ABSTRACT

An electrical connection system for cell voltage monitoring in a fuel cell stack. A fuel cell stack assembly comprises a plurality of fuel cells disposed in a stacked configuration, each cell substantially parallel to an x-y plane and including an electrical tab extending laterally from an edge of a plate in the cell in the x-direction to form an array of tabs extending along a side face of the fuel cell stack in a z-direction orthogonal to the x-y plane. A connector device comprises a planar member having a plurality of spaced-apart slits formed in an edge of the planar member, each slit having an electrically conductive material on an inside face of the slit. The slits are spaced along the edge of the planar member and configured to receive the tabs by sliding engagement in the y-direction. Alternatively, each tab may
(Continued)

be crimped to create a distortion in the tab out of the x-y plane of the plate and a connector device comprises a planar member having a plurality of generally parallel slits formed in the body of the planar member, each slit having an electrically conductive material on an inside face of the slit, the slits being spaced within the planar member and configured to receive the tabs by sliding engagement in the x-direction so that each tab engages with at least a portion of the electrically conductive material on the inside face of a respective slit.

6 Claims, 8 Drawing Sheets

(51) Int. Cl.
  *H01M 8/0247* (2016.01)
  *H01M 8/0202* (2016.01)
  *H01M 8/04537* (2016.01)
  *H01M 8/2465* (2016.01)

(52) U.S. Cl.
  CPC ..... *H01M 8/04552* (2013.01); *H01M 8/2418* (2016.02); *H01M 8/2465* (2013.01)

(58) Field of Classification Search
  USPC .......................... 429/452, 517; 439/725, 729
  See application file for complete search history.

(56) References Cited

U.S. PATENT DOCUMENTS

| | | | |
|---|---|---|---|
| 2002/0090540 | A1 | 7/2002 | Einhart et al. |
| 2003/0054220 | A1 | 3/2003 | Barton et al. |
| 2005/0186456 | A1 | 8/2005 | Andreas-Schott et al. |
| 2008/0003482 | A1 | 1/2008 | Komiyama et al. |
| 2009/0323293 | A1 | 12/2009 | Koetting et al. |
| 2012/0208104 | A1* | 8/2012 | Human ................... C25B 1/06 429/517 |
| 2013/0143446 | A1* | 6/2013 | Kobayashi ......... H01R 13/6315 439/627 |

FOREIGN PATENT DOCUMENTS

| | | |
|---|---|---|
| JP | 2003-086219 A | 3/2003 |
| JP | 2004-127777 A | 4/2004 |
| JP | 2007-265881 A | 10/2007 |
| JP | 2007-265945 A | 10/2007 |
| JP | 2008-004565 A | 1/2008 |
| TW | M285806 | 1/2006 |
| TW | M378486 | 4/2010 |
| TW | M383207 | 6/2010 |
| TW | M390552 | 10/2010 |
| TW | M391204 | 10/2010 |

OTHER PUBLICATIONS

Taiwan Patent Application No. 100144134; Office Action; dated Jul. 9, 2015; 8 pages.

* cited by examiner

CONNECTOR DEVICE INCLUDING PLANAR MEMBER WITH SLITS TO RECEIVE ELECTRICAL TABS OF FUEL CELL STACK

CROSS-REFERENCE TO RELATED APPLICATIONS

This application is a continuation of U.S. patent application Ser. No. 13/989,379 filed Nov. 12, 2013, which is a National Stage of International Patent Application No. PCT/GB2011/052265 filed Nov. 18, 2011, which claims priority to Great Britain patent application no. 1020478.2 filed Dec. 3, 2010, the contents of which are incorporated in their entirety as if fully set forth herein.

FIELD

The disclosure to electrical connector systems used in fuel cell stacks to make electrical connections to a plurality of individual cells within a fuel cell stack.

GENERAL BACKGROUND

Conventional electrochemical fuel cells convert fuel and oxidant into electrical energy and a reaction product. A typical fuel cell comprises a membrane-electrode assembly (MEA) sandwiched between an anode flow field plate and a cathode flow field plate. The flow field plates typically include one or more channels extending over the surface of the plate adjacent to the MEA for delivery of fluid fuel or oxidant to the active surface of the MEA. The flow field plates also perform the function of providing an electrical contact to the MEA across the surface thereof. In a conventional fuel cell stack, a plurality of cells are stacked together, so that the anode flow field plate of one cell is adjacent to the cathode flow field plate of the next cell in the stack, and so on. In some arrangements, bipolar flow plates are used so that a single flow field plate has fluid flow channels in both sides of the plate. One side of the bipolar plate serves as an anode flow plate for a first cell and the other side of the flow plate serves as a cathode flow plate for the adjacent cell. Power can be extracted from the stack by electrical connections made to the first and last flow plate in the stack. A typical stack may comprise many tens or even hundreds of cells.

In many fuel cell stacks, it is important to be able monitor the voltage of individual cells in the stack. Thus, it is necessary to provide electrical connector tabs to many of the flow plates in the stack. These cell voltage monitoring tabs extend, in the planes of the plates, laterally outward from the stack thereby forming an array of tabs along an edge face of the stack, so that individual electrical connectors may be coupled to each tab.

DESCRIPTION

In an effort to reduce the size and weight of fuel cell stacks, and thus increase the power density of a fuel cell stack, there has been a trend towards ever thinner flow plates, which may be formed from thin sheets of electrically conductive metal or foil that are corrugated to form the requisite channels in each face of the flow plate. This can substantially reduce size and weight of the fuel cell stack, but creates a potential difficulty in the formation of cell voltage monitoring tabs extending laterally from edges of the flow plates. A typical thickness of flow plates has hitherto been reduced to approximately 0.6 mm, which causes few problems and individual cell voltage monitoring connectors have been used. However, proposals for further reductions in flow plate thickness, for example down to 0.1 mm, can cause significant difficulties for conventional electrical connectors.

The decreasing thickness of the flow plates means that the individual tabs extending therefrom may no longer have the requisite stiffness or structural integrity to resist the necessary compressive force asserted by a conventional push-fit spring-loaded or friction-fit female connector which is applied to each tab from the ends of the tabs distal to the fuel cell stack.

Another problem is that the tabs generally do not form a perfect array in which every tab is fully aligned with, and equally spaced from, the adjacent tabs. This is due to normal manufacturing and assembly tolerances when assembling the fuel cell stack and this can provide an additional difficulty in aligning the tabs if it is desired to use a multi-tab connector.

Aspects of exemplary implementations herein disclose devices, systems and methods to address these and other problems.

In an exemplar there is disclosed aspects of a fuel cell stack assembly comprising: a plurality of fuel cells disposed in a stacked configuration, each cell substantially parallel to an x-y plane and including an electrical tab extending laterally from an edge of a plate in the cell in the x-direction to form an array of tabs extending along a side face of the fuel cell stack in a z-direction orthogonal to the x-y plane; a connector device comprising a planar member having a plurality of spaced-apart slits formed in an edge of the planar member, each slit having an electrically conductive material on an inside face of the slit; and the slits being spaced along the edge of the planar member and configured to receive the tabs by sliding engagement in the y-direction.

Each slit preferably has a curved profile along its length. The slits of the connector may have a profile in the form of an 'S'-shape along the longitudinal direction. Each slit of the connector may have a curved profile along its depth. The slits may be parallel to one another. At least some tabs may have a hook at the distal end of the tab, each hook extending in the y-direction, each hook configured to extend over a closed end of a respective slit of the planar member. Each slit may include at least one guide taper in the planar member at the open end of the slit. The array of tabs may comprise two rows of tabs separated in the y-direction, the second row being offset from the first row in the z-direction so as to facilitate electrical connection to a different set of plates in the stack than the first row. The planar member may be a printed circuit board with electrically conductive tracks extending across the planar surface to the electrically conductive material on the inside face of each slit. At least one slit may include a retention member configured to inhibit release of tabs from the connector in the y-direction.

In an exemplar there is disclosed aspects of a fuel cell stack assembly comprising: a plurality of fuel cells disposed in a stacked configuration, each cell substantially parallel to an x-y plane and including an electrical tab extending laterally from an edge of a plate in the cell in the x-direction to form an array of tabs extending along a side face of the fuel cell stack in a z-direction orthogonal to the x-y plane, each tab being crimped to create a distortion in the tab out of the x-y plane of the plate; a connector device comprising a planar member having a plurality of spaced-apart slits formed in the body of the planar member, each slit having an electrically conductive material on an inside face of the slit; and the slits being spaced within the planar member and configured to receive the tabs by sliding engagement in the x-direction so that each tab engages with at least a portion of the electrically conductive material on the inside face of a respective slit.

Each tab may be crimped to create a curved profile transverse to its length. The curved profile may be a U-shaped profile or a V-shaped profile viewed along the x-axis. The tabs may be each tapered at their distal ends such that the extent of out-of-plane distortion is reduced at the distal ends of the tabs. The array of tabs may comprise two rows of tabs separated in the y-direction, the second row being offset from the first row in the z-direction so as to facilitate electrical connection to a different set of plates in the stack than the first row. The planar member may be a printed circuit board with electrically conductive tracks extending across the planar surface to the electrically conductive material on the inside face of each slit.

In another aspect, there is an electrical connector device for connecting to a plurality of cell voltage monitoring tabs in a fuel cell stack, in which the cell voltage monitoring tabs extend laterally from an edge of the fuel cell stack, the connector device comprising: a planar member having a plurality of generally parallel slits formed in an edge of the planar member, each slit having an electrically conductive material on an inside face of the slit; the slits being spaced along the edge of the planar member and configured to receive the tabs by sliding engagement in the longitudinal direction of the slits; and each slit has a curved profile along its length.

In another aspect, there is a fuel cell stack comprising: a plurality of fuel cells disposed in a stacked configuration, each cell substantially parallel to an x-y plane and including an electrical tab extending laterally from an edge of a plate in the cell in the x-direction to form an array of tabs extending along a side face of the fuel cell stack in a z-direction orthogonal to the x-y plane; each tab including a hook at the distal end of the tab, each hook extending in the y-direction.

In another aspect, there is a fuel cell stack comprising: a plurality of fuel cells disposed in a stacked configuration, each cell substantially parallel to an x-y plane and including an electrical tab extending laterally from an edge of a plate in the cell in the x-direction to form an array of tabs extending along a side face of the fuel cell stack in a z-direction orthogonal to the x-y plane, each tab being crimped to create a distortion in the tab out of the x-y plane of the plate to create a curved profile transverse to its length.

Exemplars are described by way of example and with reference to the accompanying drawings.

DRAWINGS

Figure 1:
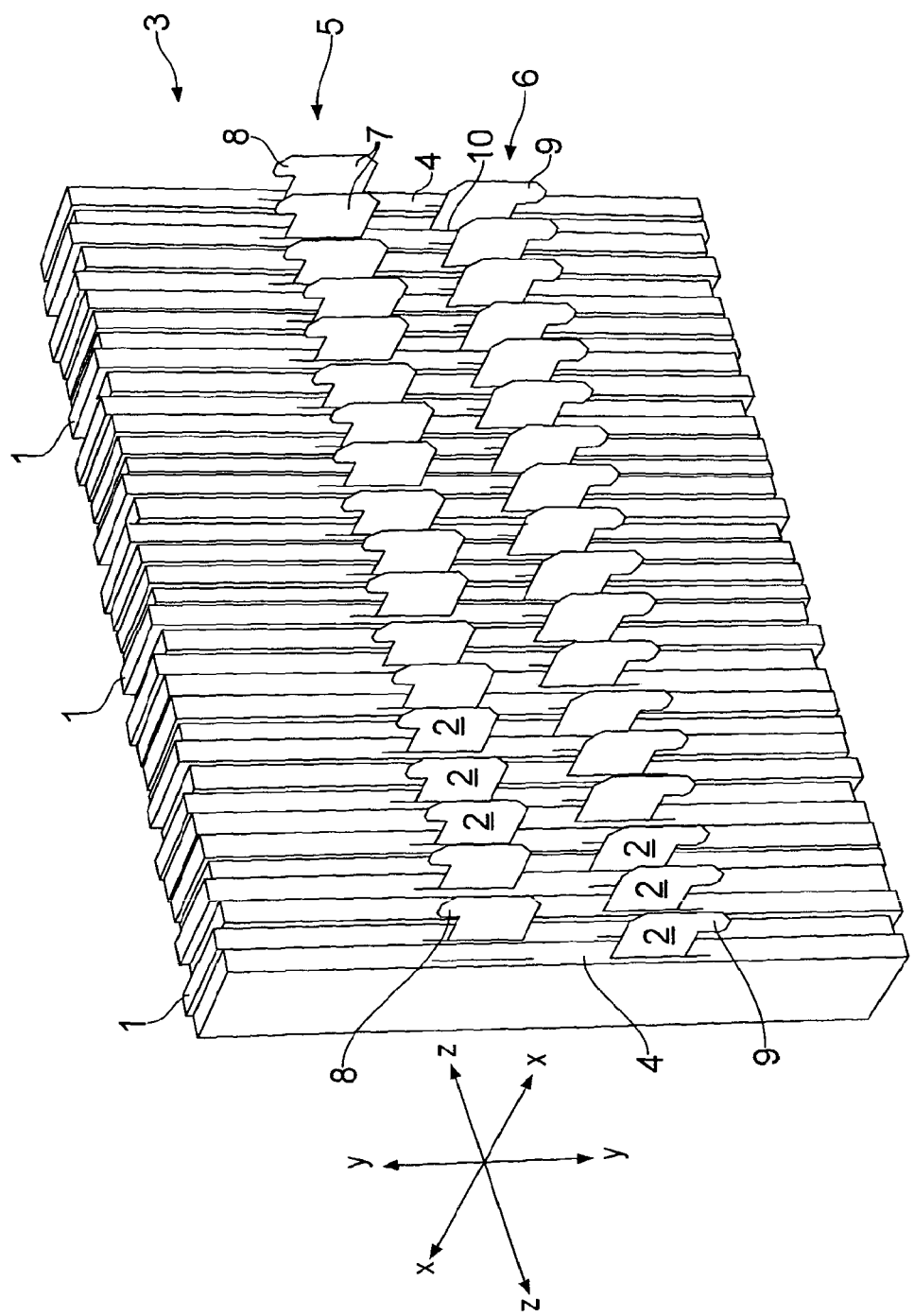
FIG. 1 is a perspective view of a portion of a side face of a fuel cell stack with an array of cell voltage monitoring electrical connection tabs extending out of the side face from each cell.

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures, in which like reference numerals are carried forward. All descriptions and callouts in the figures are hereby incorporated by this reference as if fully set forth herein.

Throughout the specification, the descriptors relating to relative orientation and position, such as "top", "bottom", "left", "right", "up", "down", "front", "back", as well as any adjective and adverb derivatives thereof, are used in the sense of the orientation of fuel cell stack as presented in the drawings. However, such descriptors are not intended to be in any way limiting to an intended use of the described or claimed invention.

With reference to FIG. 1, a fuel cell stack includes a number of cells 1 in a stacked configuration. Each cell 1 includes a number of components such as a membrane-electrode assembly, electrode diffuser materials and sealing gaskets sandwiched between fluid flow plates as well known in the art and not described further here. Each cell 1 is a generally planar structure occupying an x-y plane. As shown in FIG. 1, the x-axis extends into/out of the plane of the paper, while the y-axis extends in the vertical direction. The z-axis extends left to right. However, no limitation on the stack is implied by any particular choice of orientation of orthogonal x-y-z axes.

Each bipolar flow plate in the stack includes a cell voltage monitoring electrical connection tab 2 extending in the x-direction from a side face 3 of the stack. Each tab 2 emerges from an edge 4 of a respective cell 1, e.g. through a pair of gasket seals (not shown). The plurality of tabs 2 form an array, and in the embodiment shown the array is a two-dimensional array in which a first row 5 of tabs 2 is separated in the y-direction from a second row 6 of tabs 2. The second row 6 of tabs 2 is also offset from the first row 5 of tabs 2 in the z-direction. This enables alternating ones of the bipolar plates in the stack to be connected via cell voltage monitoring tabs 2 in each row 5, 6 of the array, such that the density of tabs in the z-direction can be substantially reduced, in this case by half.

It will be understood that the number of rows 5, 6 in the array of tabs 2 can be one, two or more. The tabs 2 can be provided for every cell in the stack or for less than every cell in the stack. The tabs 2 may correspond to each bipolar plate as described in this example, or if separate cathode flow plates and anode flow plates are used in the stack, the tabs 2 may be provided for one or both of each of the cathode and anode flow plates.

Each tab 2 is preferably formed as an integral part of the plate, for example pressed or stamped out of a sheet at the same time as the foil plate. Tabs 2 may be formed in multiple places on one or more edges of the plates.

As shown in FIG. 1, each tab 2 is preferably formed with a hook 8, 9 at the distal end 7 of the tab 2 (the distal end being the end remote from the body of the plate). The hooks 8, 9 each extend in the y-direction, i.e. parallel with the side face 3 of the stack. The hooks 8 in the first row 5 preferably extend in the positive y-direction while the hooks 9 in the second row 6 extend in the opposite, i.e. negative y-direction, such that the hooks all face outwardly. Because of manufacturing tolerances, each plate in the stack, and therefore each tab 2 in the array, may be shifted slightly from a precisely regular array position, as shown exaggerated in the drawing. A typical scatter of components may arise from positional tolerances of ±0.2 mm. The thickness of the tabs may be as low as 0.1 mm or thinner.

Figure 2:
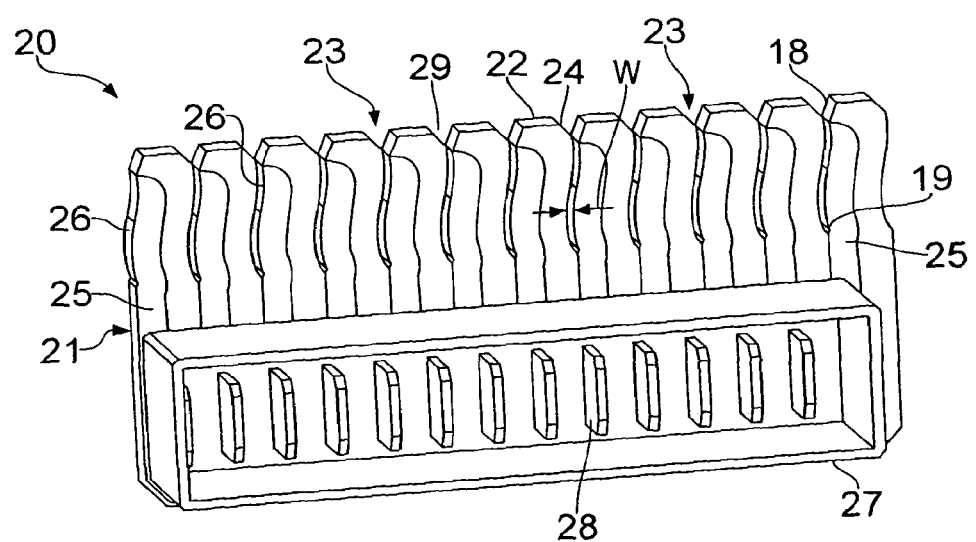
FIG. 2 is a perspective view of a connector device configured to mate with a row of connection tabs in the array of FIG. 1.

Referring to FIG. 2, a connector device 20 for coupling to the tabs 2 is now described. The connector 20 has a generally planar member 21 which may be a printed circuit board or other suitable generally stiff material. An edge 22 of the planar member 21 has a plurality of slits 23 formed therein. The slits 23 preferably extend through the thickness of the planar member 21 to form a comb-like structure. The slits 23 preferably have a width w which may taper out towards the open end 24 of each slit. A plurality of conductive tracks 25 are formed on a face of the planar member 21, each of which extends into a respective slit such that there is an electrically conductive material 26 on an inside face of each slit 23.

Each slit preferably has a curved profile along its length, i.e. when viewed along an axis orthogonal to the plane of the planar member. Preferably as shown in FIG. 2 the curved profile is in the form of a shallow 'S' shape extending along the longitudinal direction of the slit 23. Each slit has an open end 29 and a closed end 19. Each slit preferably has a bevel, chamfer or taper 18 at its open end 29 such that the slit widens at the open end. The expression 'taper' is intended to encompass both a bevelled end and a chamfered end. The taper may be provided on one or both walls of the slit 23. The taper 18 is preferably configured to widen the slit 23 at the open end 29 a sufficient amount so as to guide a tab 2 into the slit 23 taking into account the manufacturing tolerances of the stack, e.g. ±0.2 mm displacement of a tab for a given tab thickness of, e.g. 0.1 mm. Thus, the slit 23 may be widened at its open end 29 several fold. Those of ordinary skill in the art will recognize that the exact dimensions of the "S" shape within the figures are not intended to be, nor should they be considered, a limitation on the scope of the disclosure.

Each connector 20 also includes a connector socket 27 mounted to the face of the planar member 21 with a plurality of electrical terminals 28 for connection to a conventional external plug, such as that found on a conventional ribbon cable or similar. Each of the conductive tracks 25 may be connected to a respective one of the electrical terminals 28.

Figure 3:
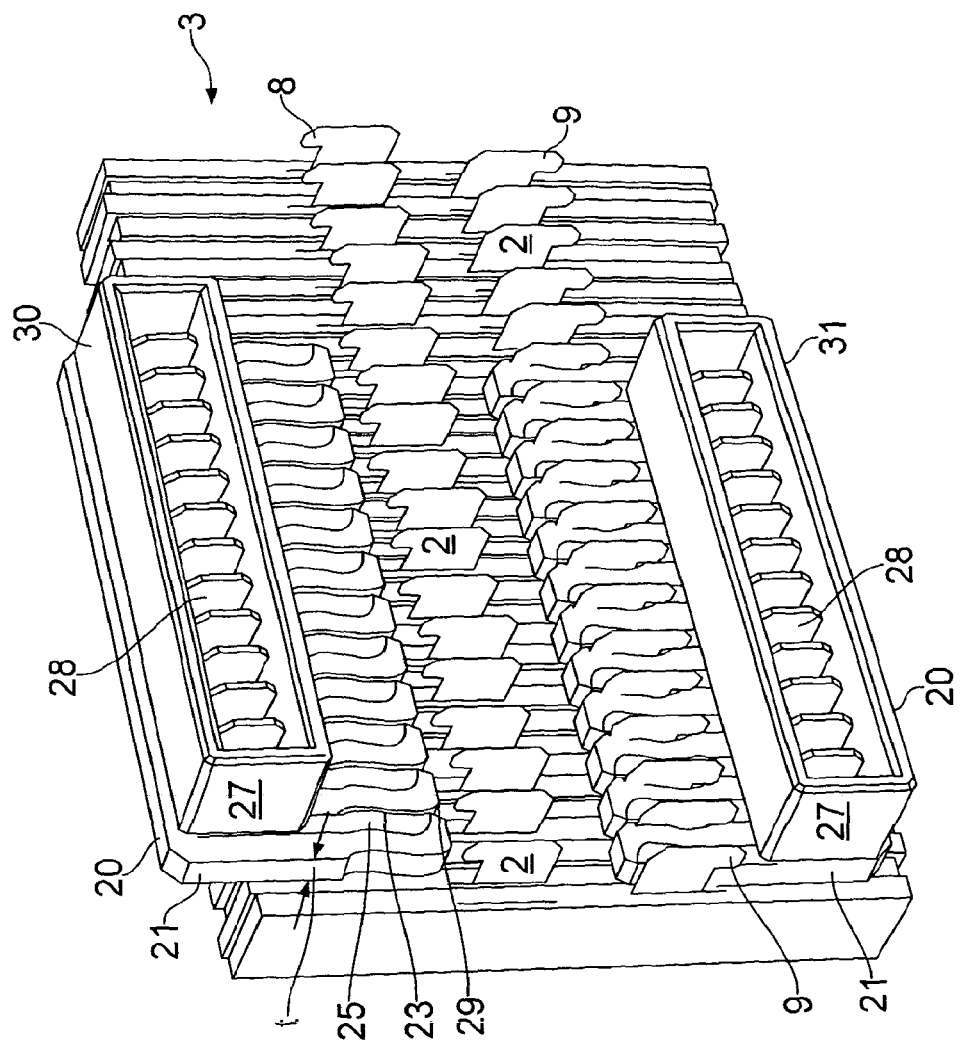
FIG. 3 is a perspective view of the portion of the side face of a fuel cell stack as shown in FIG. 1, further including a pair of connector devices in which the upper connector device is positioned ready for engagement with an upper row of connection tabs and the lower connector device is coupled to the lower row of connection tabs.

Referring now to FIG. 3, the mating of the connector device 20 with an array of tabs 2 is now described. FIG. 3 shows two connector devices 20, an upper connector 30 and a lower connector 31. The connector device 20 is configured to present the planar member 21 to the side face 3 of the fuel cell stack such that the open ends 29 of each slit 23 present to a respective one of the tabs 2, as seen in the top portion of FIG. 3, indicated by upper connector 30. The upper connector 30 is thus positioned ready for sliding engagement with the tabs 2 in the y-direction, i.e. downwards. The thickness t of the planar member 21 is preferably such that as the tabs 2 each slide into a respective slit 23, the hooks 8, 9 lie beyond the plane of the planar member 21 and, when the connector 20 is fully engaged, at least some hooks 8, 9 will hook over the planar member 21 at the closed end 19 of the slit, as most clearly seen in the upper connector of FIG. 4. This assists in preventing the connector from becoming detached from the tabs. The lower connector 31 of FIG. 3 is already engaged with its row of tabs 2 and also shows this aspect. The length of the slits 23 is preferably slightly longer than width of each tab (in the y-direction as seen in FIG. 1).

The taper 18 at the open end 29 of each slit 23 is configured to guide each tab 2 for easy sliding engagement with the slit 23 notwithstanding possible displacement of the tab from an exactly regular array position. Such departures from a strictly regular array can be a typical feature of normal manufacturing tolerances. The width w of the slits 23 (see FIG. 2) is preferably selected to be wider than the thickness of the tabs, to ensure easy sliding engagement of the tabs 2 without undue friction that could otherwise collapse or squash the tabs flat against the face of the fuel cell stack, given their thinness and therefore low degree of stiffness. The preferred curved shape of the slit 23 is selected so that good electrical contact of each tab 2 with the electrically conductive material 26 on inside faces of the slits. As the tab 2 is gently forced to follow the curve of the slit, its surfaces will engage with the slit in at least one or more places.

Although the preferred profile of slit 23 is an S-shaped curve travelling along the plane of the planar member 21 (in the y-direction relative to the fuel cell stack), other curved profiles of slit 23 may be used that result in the creation of a minor distortion in the tab out of its x-y plane so as to ensure contact with the inside faces of the slit 23. For example, a simple shallow C-curve (one bend) rather than the two-bend S-curve could be used, or a three or more bend curve. The slit may also be described as "serpentine" in profile along its length. The curved profile could alternatively or additionally be a curvature travelling through the plane of the planar member, i.e. the side walls of the slits are not perpendicular to the plane of the planar member, if the planar member is made thick enough. Most generally, the curved profile of the slits is one which provides for minor distortion of a tab 2 sufficient to ensure good contact with the sidewalls of the slit while insufficient to cause a collapse of the tab during sliding engagement. Those of ordinary skill in the art will recognize that the exact dimensions of the "C" or "S" shape within the figures are not intended to be, nor should they be considered, a limitation on the scope of the disclosure.

The minor distortion of the tabs that provides for good electrical connection is preferably an elastic deformation so that operation of the connector is reversible and re-engageable.

By providing a sliding engagement of the connector 20 with the tabs 2 in the y-direction, rather than the conventional x-direction, the likelihood of collapse of the tab is substantially reduced not least because the early part of the engagement occurs towards the base 10 of each tab 2 rather than axially inwards from the distal end 7 of each tab 2. The tapering 18 of the slits 23 also ensures that each tab 2 is properly captured within a slit before any sliding engagement/distortion force is generally applied by the first curved part of the slit, even when some lateral displacement of the tab is required to overcome manufacturing alignment tolerances discussed earlier.

Figure 4:
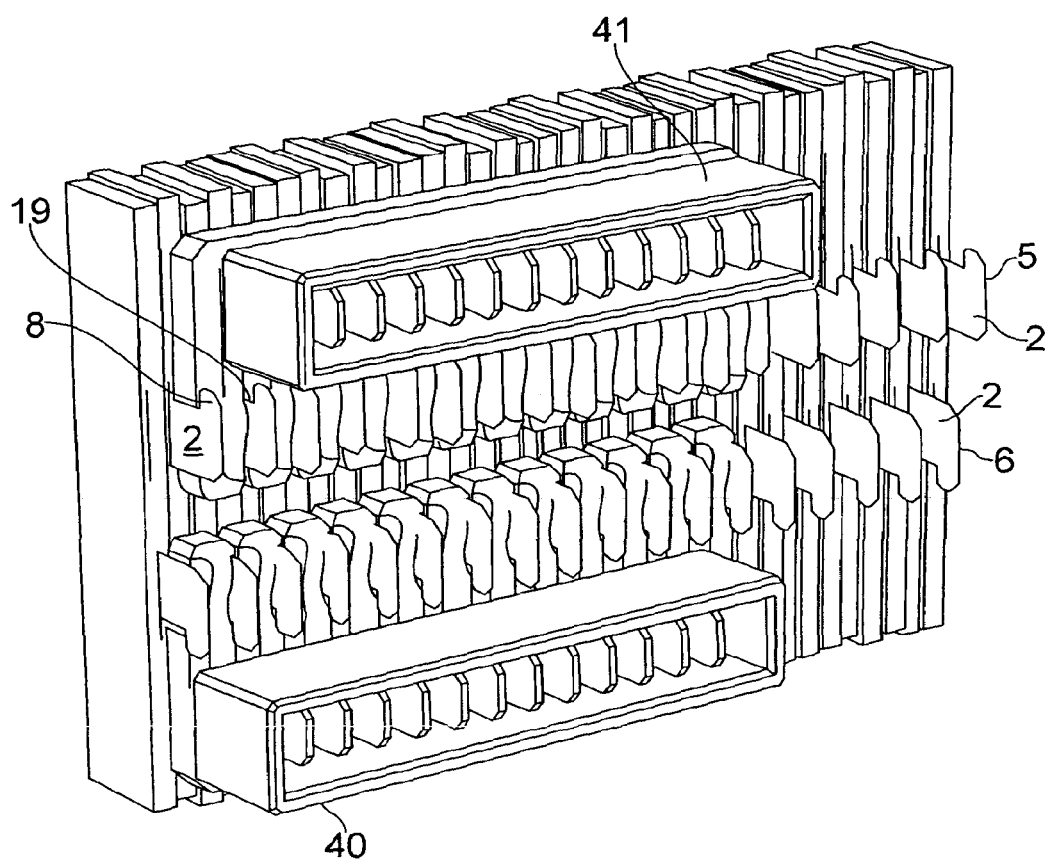
FIG. 4 is a perspective view of the portion of the side face of a fuel cell stack as shown in FIGS. 1 and 3, further including a pair of connector devices coupled to the connection tabs.

FIG. 4 shows an upper connector 41 and a lower connector 40 both fully engaged with a respect first row 5 and second row 6 of tabs 2.

Figure 5:
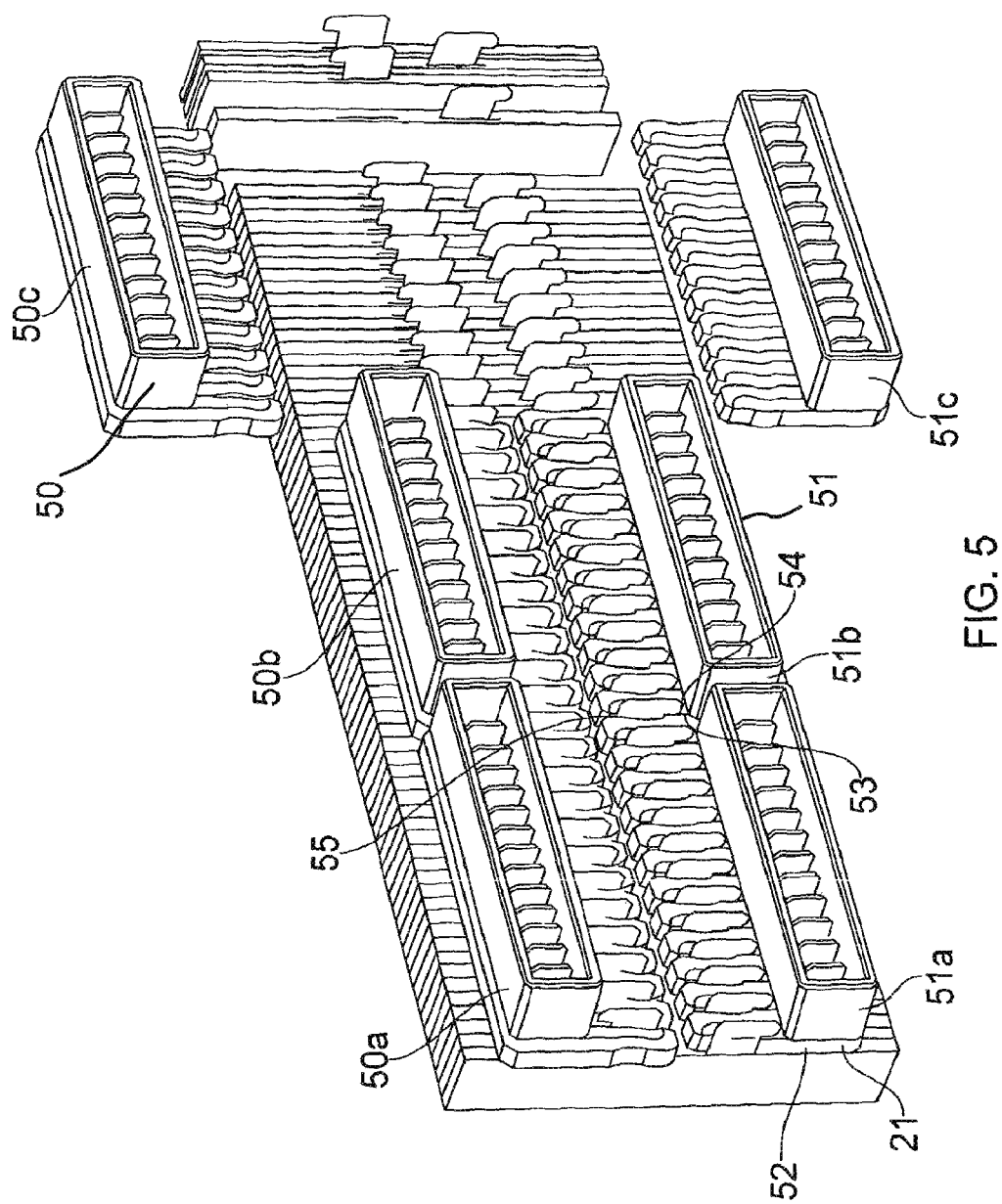
FIG. 5 is a perspective view of an extended portion of the side face of a fuel cell stack showing multiple connector devices coupled thereto and a further pair of connector devices in position ready for sliding connection to the connection tabs.

FIG. 5 shows a number of connectors 50*a*, 50*b*, 50*c*, 51*a*, 51*b*, 51*c* can be used to connect to long rows of tabs 2. Connecting to smaller groups of tabs 2 can be advantageous in avoiding problems with significant run-out in tab pitch over the length of a large fuel cell stack and reduces the risk of damage to individual tabs during connector insertion. In a preferred configuration, the connectors 50, 51 are formed such that a lateral edge 52 of a planar member 21 is shaped to form one half of a "slit" which will be completed when two adjacent connectors 50*a*, 50*b* or 51*a*, 51*b* are connected to the tabs. Thus, the right hand edge 53 of connector 51*a* forms the left side of a slit 55 and the left hand edge 54 of connector 51*b* forms the right side of the slit 55. The slit 55 is thus "created" when the second of an adjacent pair of connectors 51*a*, 51*b* are coupled to the tabs 2 by sliding engagement.

Figure 6:
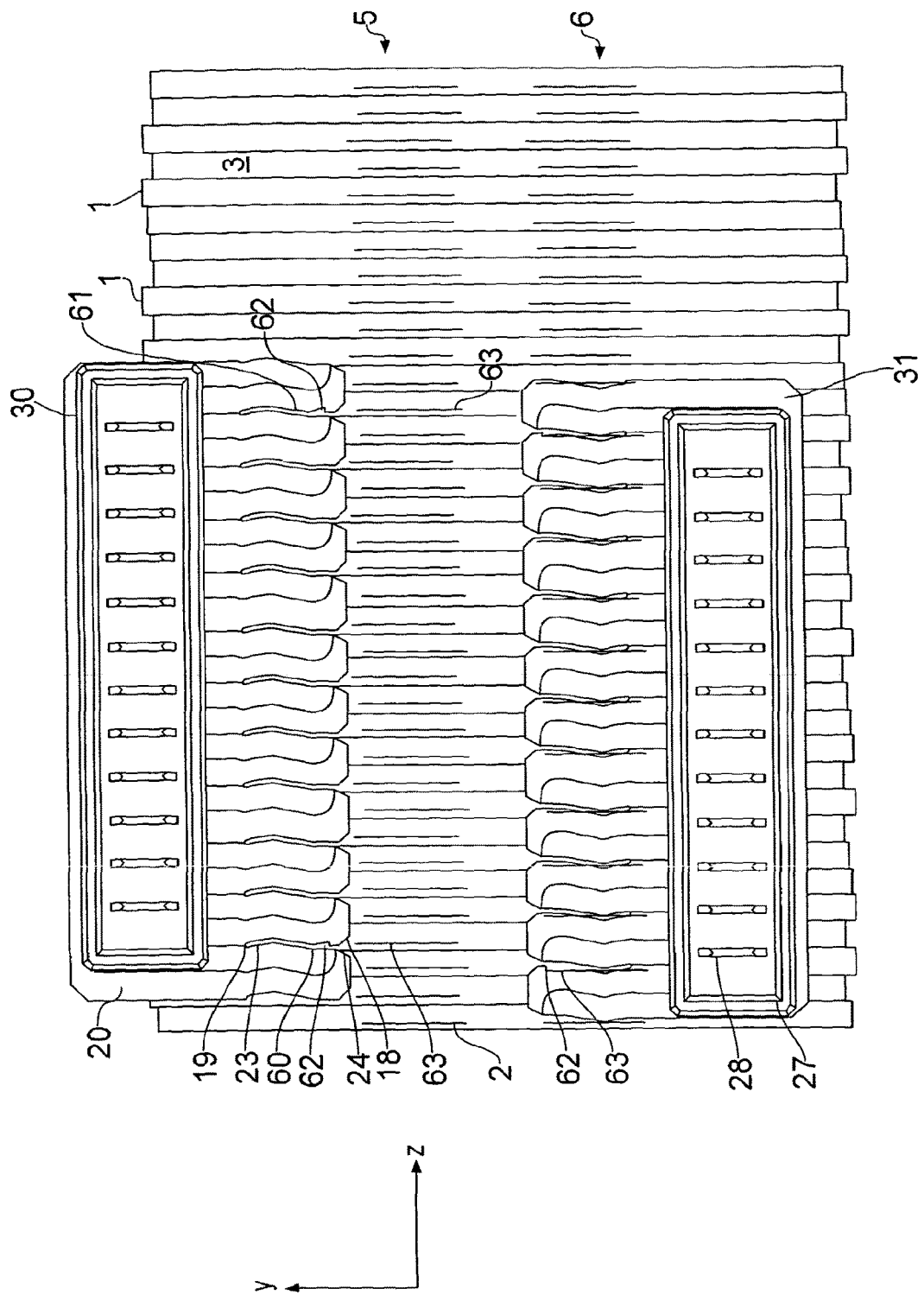
FIG. 6 is a side elevation of the portion of side face of a fuel cell stack as shown in FIG. 3.

FIG. 6 shows a side elevation of the arrangement shown in figure in perspective view, more clearly showing upper and lower connectors 30, 31, S-shaped slits 23 of width w, having tapers 18 at the open ends 24 and also showing the closed ends 19. FIG. 6 also shows how selected slits 60, 61 may be provided with a "barb" feature 62 configured to capture a respective tab 63 once it is fully engaged in the slit 60, 61 to thus enhance retention of the upper connector 30 on the tabs 2, 63. Lower connector 31 shows the tab 63 captive behind the barb 62. To release the upper and lower connector 30, 31 from the tabs 2, 63, the two end tabs 63 may be manually deflected to disengage the leading edge from the barb. Other forms of retention mechanism or retention members may be used instead of or as well as the barbs 62 in order to inhibit release of tabs from the connector in the y-direction.

For manufacturing convenience, each field plate could be formed with two or more tabs extending from one edge, with one or more tabs being removed from each plate during assembly so that the remaining tab on a plate is positioned in the appropriate row 5 or 6 of the array of tabs.

An alternative configuration of tab and connector member is now described with reference to FIGS. 7 and 8. In this arrangement, best seen in the left hand portion of FIG. 7, each tab 71 emerging from the stack side face 70 is crimped to create a distortion in the tab out of the x-y plane of the relevant plate. This crimp is preferably applied during pressing of the flow plate during manufacture of the flow plate and the corrugated flow channels therein, although it can be applied separately. The crimp preferably creates a curved or angled profile transverse to the length of the tab (x-direction), and more preferably in the shape of a shallow "U"-shape or shallow "V"-shape when the tab is viewed end on (i.e. when viewed along the x-axis in the drawing). Other features of the fuel cell stack forming the stack side face 70 may be as described in connection with the arrangement of FIGS. 1 to 6.

Figure 7:
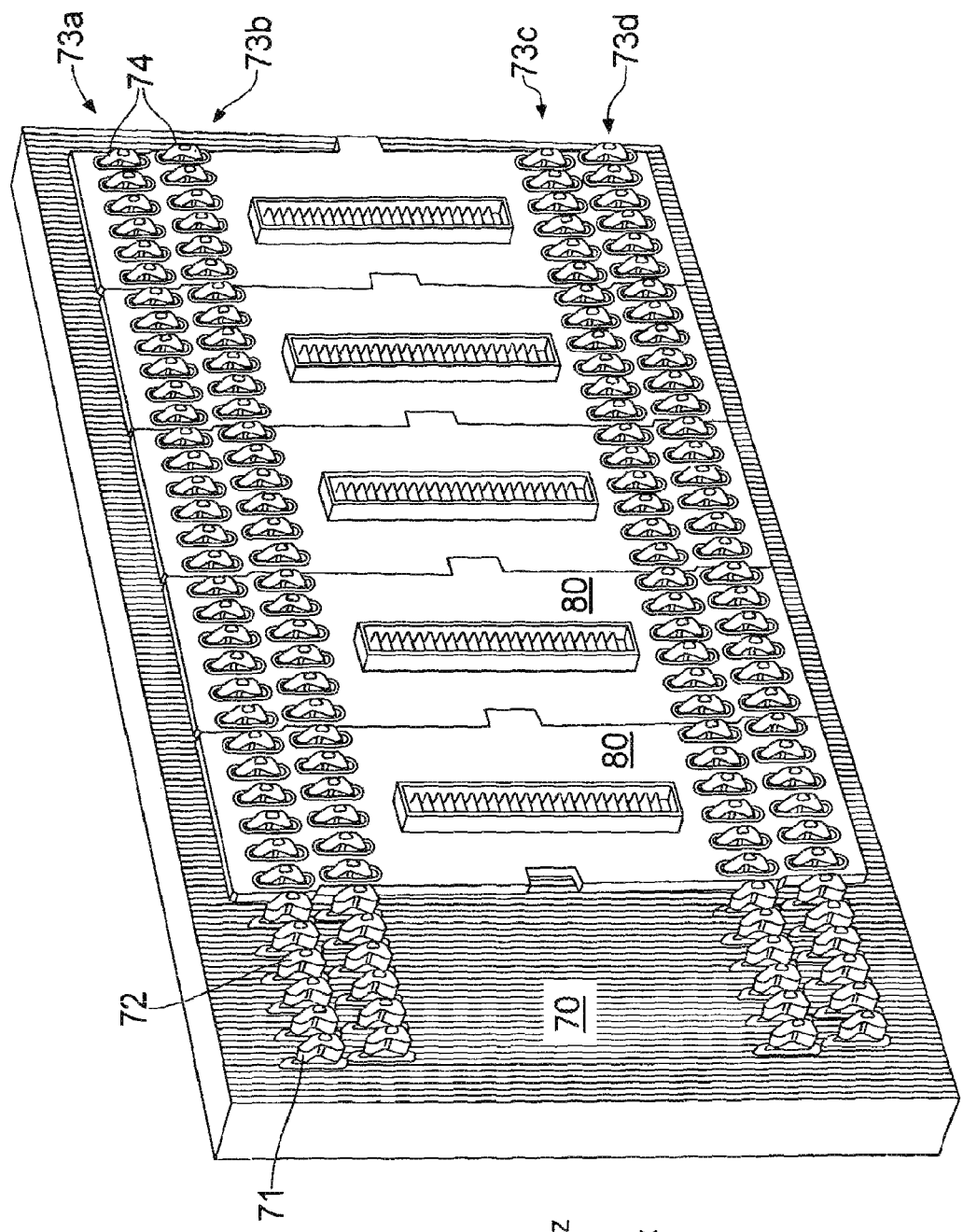
FIG. 7 is a perspective view of a portion of the side face of a fuel cell stack with an array of cell voltage monitoring electrical connection tabs extending out of the side face from each cell and a number connector devices coupled thereto.
Figure 8:
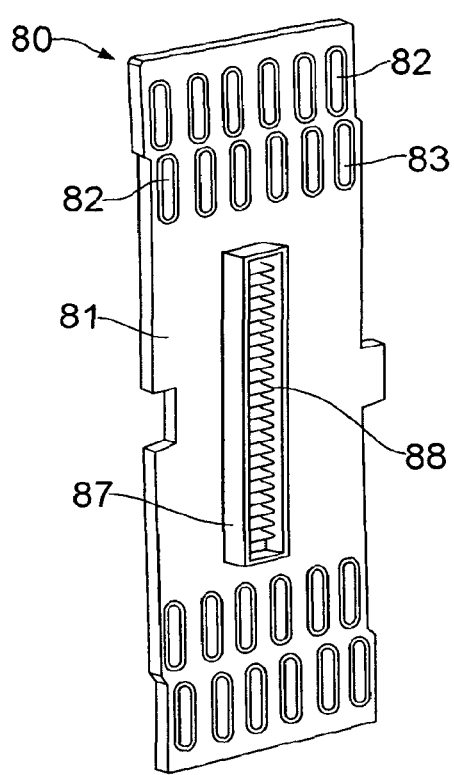
FIG. 8 is a perspective view of a connector device configured to mate with a row of connection tabs in the array of FIG. 7.

Also as shown in FIG. 7, the tabs 71 preferably have tapered distal ends 72, e.g. with bevelled or chamfered corners at the distal ends rather than square or rectangular distal ends. It will be understood that tapering the end of each tab 71 that is crimped into a U-shape or V-shape in the y-z plane has the effect of reducing the out-of-plane (x-y plane) distortion that exists at the distal ends of the tabs and thus reduces the initial resistance to insertion into a slit of a connector as will now be described with reference to FIG. 8.

Each connector device 80 comprises a generally planar member 81 having a plurality of spaced-apart slits 82 formed in the body of the planar member. Each slit 82 has an electrically conductive material 83 on an inside face of the slit. The slits 82 are spaced within the planar member body to match arrays of tabs 74 on the fuel cell stack and are thereby configured to receive the tabs by sliding engagement in the x-direction so that each tab 71 engages with at least a portion of the electrically conductive material 83 on the inside face of a respective slit.

The crimped profile of each tab 71 is arranged so that the height of the "U"-shape or "V" shape in the y-z plane is sufficient that each tab 71 will be forced to distort or elastically deform somewhat in order to fully engage in the slit 82 thereby assuring good electrical contact with the electrically conductive material 83. The tapered distal ends 72 of the tabs 71 ensures that the tabs 71 can initially pass into the slits 82 with little or no resistance; it is only once the tabs have been guided part way into the slits 82 that the increasing z-profile of the tabs causes engagement with the walls of the slits. By that point, the tabs 71 are preferably sufficiently guided and captured by the slits 82 that collapse or creasing of the tabs is unlikely, even if there is some alignment error in the positions of the tabs from a completely regular array. FIG. 7 shows a number of connector devices 80 in engaged position.

Each connector device 80 further includes a connector socket 87 mounted to the face of the planar member 81 with a plurality of electrical terminals 88 for connection to an external plug, such as that found on a conventional ribbon cable or similar. The electrically conductive material 83 located in each slit 82 is electrically connected to a respective terminal 88, for example by way of a conductive track formed on and extending across the surface of the planar member 81. As in the earlier described embodiments, the planar member may be a printed circuit board (PCB) or other suitable generally stiff material.

In a preferred arrangement, the fuel cell stack provides an array of tabs 71 comprising two or more rows of tabs separated in the y-direction. In the example shown in FIG. 7, there are four such rows 73*a*-73*d*. Each of the successive rows is preferably offset from all of the other rows in the z-direction so as to facilitate electrical connection to a different set of plates in the stack than any of the other rows.

The connectors described above in all embodiments are particularly suitable as self-supporting, easily attached connectors that are robust and vibration-resistant while still taking into account the delicate nature of thin connector tabs. In the embodiments of FIGS. 1 to 6, the tapered nature of the slits and the angle of approach when the connector is coupled to the tabs makes the connectors particularly suitable for tabs that have particularly large tolerances in position during assembly, and can accept relatively large pitch variations. Similarly, the tapered nature of the tabs in the embodiments of FIGS. 7 and 8 provides accommodation to large tolerances in tab position during assembly, and can accept relatively large pitch variations.

The low insertion force required for engagement of the tabs makes the connectors suitable for easy removal and reconnection without damage to the tabs. The side entry of the connectors onto the tabs in the embodiments of FIGS. 1 to 6 means that they are advantageously compact and low profile. The connectors can readily be made modular in nature and the use of a PCB planar member makes the connectors low cost and easily integrated with other components. The connector assembly can be used for both etched and pressed fuel cell field plates and separator plates.

By using connectors that couple to many tabs at once, assembly costs can be significantly reduced as can assembly errors. Risks of shorting between adjacent tabs may also be reduced and adjacent tab insulation is provided by the structure of the PCB.

The slits in the PCB planar members can be formed by any suitable process, such as water, laser or die cutting. A preferred configuration of connector of the arrangements of FIGS. 1 to 6 has eleven slots but accommodates twelve tabs by virtue of cooperation with an adjacent connector as described earlier.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure also includes any and all implementations of the following claims.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element, disclosed, should be understood to encompass a disclosure of the action which that physical element facilitates. In this regard, it should be understood that, for practical reasons, and so as to avoid adding potentially hundreds of claims, the applicant has presented claims with initial dependencies only.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Support should be understood to exist, to the degree required under new matter laws, —including but not limited to United States Patent Law 35 USC 132 or other such laws, —to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A fuel cell stack assembly comprising:
a plurality of fuel cells disposed in a stacked configuration to define a fuel cell stack, each cell substantially parallel to an x-y plane and including an electrical tab extending laterally from an edge of a plate in the cell in the x-direction to form an array of tabs extending along a side face of the fuel cell stack in a z-direction orthogonal to the x-y plane, each tab being crimped to create a distortion in the tab out of the x-y plane of the plate; and
a connector device comprising a planar member having a plurality of spaced-apart slits formed in a body of the planar member, each slit having an electrically conductive material on an inside face of the slit, wherein
the slits are spaced within the planar member and configured to receive the tabs by sliding engagement in the x-direction so that each tab engages with at least a portion of the electrically conductive material on the inside face of a respective slit, and
wherein each tab has a length in the y-direction and is crimped to create one of a U-shaped profile and a V-shaped profile viewed along the x-axis, and
wherein the tabs are each tapered at their distal ends such that the extent of out-of-plane distortion is reduced at the distal ends of the tabs, each tab having beveled or chamfered corners at their distal ends.

2. The fuel cell stack assembly of claim 1, in which the distortion includes a curved or angled profile when viewed in the x-axis direction.

3. The fuel cell stack assembly of claim 1 in which the planar member is a printed circuit board with electrically conductive tracks extending across the body to the electrically conductive material on the inside face of each slit.

4. The fuel cell stack assembly of claim 1, in which the slits and the tabs are configured to slidably engage in the x-direction via each tab engages with at least a portion of the electrically conductive material on the inside face of a respective slit.

5. The fuel cell stack assembly of claim 1 in which the array of tabs comprises a first row of tabs and a second row of tabs, the first row and the second row being separated in the y-direction, the second row being offset from the first row in the z-direction so as to facilitate electrical connection to a different set of plates in the stack than the first row.

6. A method of assembling a fuel cell stack assembly, the method comprising:
   disposing a plurality of fuel cells disposed in a stacked configuration to define a fuel cell stack, each cell substantially parallel to an x-y plane and including an electrical tab extending laterally from an edge of a plate in the cell in the x-direction to form an array of tabs extending along a side face of the fuel cell stack in a z-direction orthogonal to the x-y plane, each tab being crimped to create a distortion in the tab out of the x-y plane of the plate to create a U-shaped profile or a V-shaped profile when viewed in the x-axis direction, each of the tabs the tabs being tapered at their distal ends such that the extent of out-of-plane distortion is reduced at the distal ends of the tabs, each tab having beveled or chamfered corners at their distal ends;
   providing a connector device comprising a planar member having a plurality of spaced apart slits formed in the body of the planar member, each slit having an electrically conductive material on an inside face of the slit, the slits being spaced within the planar member and configured to receive the tabs;
   sliding the connector device relative to the tabs in the x-direction so that each tab engages with at least a portion of the electrically conductive material on the inside face of a respective slit.

\* \* \* \* \*